United States Patent [19]

Hoch et al.

[11] Patent Number: 5,074,680
[45] Date of Patent: Dec. 24, 1991

[54] ANGULAR CONTACT BEARINGS AND METHOD FOR MAKING THE SAME

[75] Inventors: Paul-Gerhard Hoch, Schweinfurt; Karl-Friedrich Kaschube, Niederwerrn; Heinrich Winter, Schweinfurt, all of Fed. Rep. of Germany

[73] Assignee: SKF GmbH, Schweinfurt, Fed. Rep. of Germany

[21] Appl. No.: 509,024

[22] Filed: Apr. 13, 1990

[30] Foreign Application Priority Data

Apr. 15, 1989 [DE] Fed. Rep. of Germany ....... 3912449

[51] Int. Cl.$^5$ ............................................. F16C 19/28
[52] U.S. Cl. ..................... 384/560; 384/584
[58] Field of Search ............... 384/564, 571, 450, 508, 384/585, 560, 584

[56] References Cited

U.S. PATENT DOCUMENTS

| | | | |
|---|---|---|---|
| 4,728,204 | 3/1988 | Colanzi et al. | 384/564 |
| 4,834,560 | 5/1989 | Jacob et al. | 384/564 |
| 4,900,166 | 2/1990 | Candiard | 384/571 |

*Primary Examiner*—Lenard A. Footland
*Attorney, Agent, or Firm*—Eugene E. Renz, Jr.

[57] ABSTRACT

Pretensioned, two-row, angular-contact bearing, consisting of one-piece bearing rings with rolling elements between them, resting against flanges on at least one of the bearing rings, characterized in that the wall thickness of one bearing ring (1) is relatively small in comparison to its outer diameter, so that it can be elastically deformed in the radial direction.

2 Claims, 1 Drawing Sheet

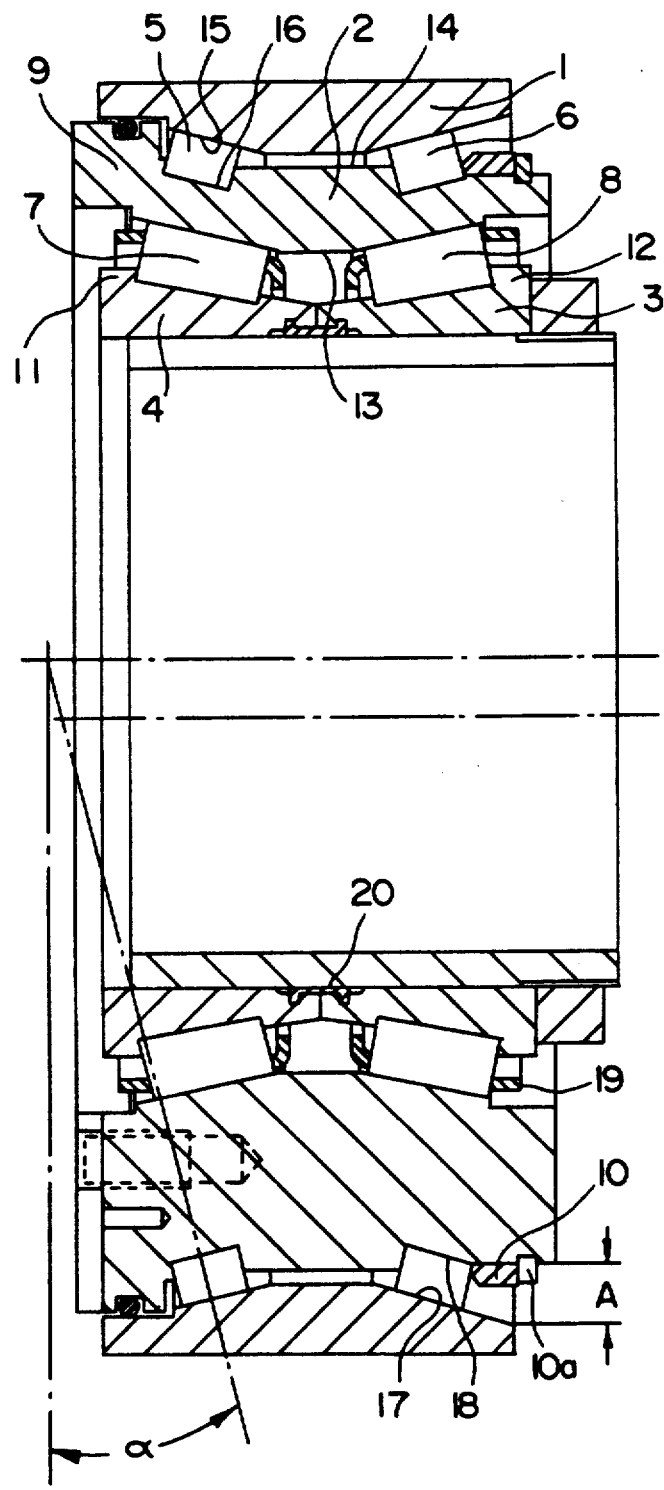

ANGULAR CONTACT BEARINGS AND METHOD FOR MAKING THE SAME

FIELD OF THE INVENTION

The present invention relates to improvements in two-row, angular contact bearings assemblies and specifically to a pretensioned assembly consisting of one piece bearing rings with rolling elements which rests against flanges on at least one of the bearing rings.

BACKGROUND OF THE INVENTION

Two row angular ball bearings are not new per se. U.S. Pat. No. 3,532,401 shows a typical assembly. In accordance with this patent, the rolling elements of one of the rows are installed first and then the inner ring is tipped with respect to the outer ring to create an insertion opening facilitating the assembly of the rolling elements of the second row. This method is relatively complicated and does not lend itself to bearings having so called "full complements" of rolling elements. In the case of roller bearings, the practice in the past has been to split one of the bearing rings transversely relative to its axis and to create the pretention by axial displacement of the two ring parts.

SUMMARY OF THE INVENTION

With the above in mind, it is an object of the present invention to provide an improved two row angular contact bearing characterized by novel features of construction and arrangement facilitating adjustment of the pretension easily and to a novel method for assembling bearings of this type.

To this end, in accordance with the present invention, the wall thickness of one of the rings is of a dimension which is relatively small in relation to its outside diameter so that it can be elastically deformed in the radial direction. In accordance with the present invention, the bearing elements are assembled by first installing the rolling elements of one of the rows on the raceway of one of the bearing rings and thereafter pushing the outer ring in place until one of its raceways rest against the rolling elements. The outer ring is then pushed axially against the rolling elements and expanded in the elastic region in the radial direction by the rolling elements resting against the raceway to such an extent that the opening between the bearing rings allows the insertion of the second row of rolling elements. Finally, the rolling elements of the second row are inserted and held in their position by suitable means.

BRIEF DESCRIPTION OF THE DRAWINGS

These and other objects of the present invention and the various features and details of the operation and construction thereof are hereinafter more fully set forth with reference to the accompanying drawing, wherein:

FIG. 1 is a transverse sectional view through a double row angular contact bearing in accordance with the present invention.

DETAILED DESCRIPTION OF THE PREFERRED EMBODIMENT

Referring now to the drawing, there is illustrated a two row angular contact roller bearing constructed in accordance with the present invention. The bearing consists of a one piece outer ring 1, an intermediate ring 2, and a two part inner ring 3 and 4. The outer ring 1 and intermediate ring 2 have confronting pairs of raceways 15, 16, and 17, 18. The inner peripheral surface of the intermediate ring and the inner rings have confronting raceways 2b, 3a, 4a respectively to accommodate two rows of rollers 5, 6 and 7, 8 which engage in the annular space between the raceways of the rings. The rollers 5 and 6 between the outer ring 1 and the intermediate ring 2 are cylindrical rollers and the rollers 7 and 8 between the intermediate ring 2 and the inner rings 3 and 4 are conical rollers 7, 8 arranged in a so-called "0-configuration". The intermediate ring 2 has an annular flange 9 forming an outer abutment for the rows of rollers 5 and a flange 10 held in by a lock ring 10a is located at the intermediate ring 2 to confine the rollers in row 6. The inner rings 3 and 4 are provided with radially outwardly directed flanges 11 and 12 to limit axial movement of the conical rollers 7 and 8 in the raceways. The bore surface 13 of the intermediate ring 2 is eccentric to its lateral surface 14.

Considering now assembly of a bearing in accordance with the present invention, the cylindrical rollers 5 of one of the rows are first placed on the raceway 16 of intermediate ring 2 and then outer ring 1 is pushed onto intermediate ring 2 so that the raceway 15 rests against cylindrical rollers 5. Outer ring 1 is pushed axially relative to intermediate ring 2 and expanded in the elastic region by such an extent by the cylindrical rollers 5 resting against raceway 15 creating an insertion opening A between the outer ring 1 and the intermediate ring 2 of a large enough size to allow the conical roller 6 of the second row to be inserted easily between the raceways 17 and 18. This expansion is possible by reason of the fact that the wall of the outer ring is relatively thin and the contact angle $\alpha$ is relatively small. The contact angle $\alpha$ between the lines of action of the rolling element loads and a plane perpendicular to the bearing axis A—A is preferably less than 15° so that the radial force component acting to expand the ring is as large as possible during the process of axial displacement discussed previously. The axial pressure applied to achieve the displacement and creation of the insertion opening A is maintained until flange 10 has been pushed onto the lateral surface of the intermediate ring and held in place by a lock ring 10a. The axial dimension of the flange ring 10 are defined in accordance with the pretension desired. Thereafter, the parts of the inner ring 3 and 4 with conical roller 7 and 8 are arranged in a cage 19 are pushed into the bore of the intermediate ring 2 and the inner ring parts 3 and 4 are connected by the U-shaped retaining clip 20 which has angled shanks engageable in ring shaped grooves 21 in the inner ring parts 3 and 4.

In a particular embodiment of two row angular contact bearing in accordance with the present invention, the outer diameter D of the outer ring is 175 mm and the wall thickness T measured in center of the rolling element of raceway is 8 mm. Thus the ratio of wall thickness T to outside diameter is about 1:22.

Even though a particular embodiment of the invention has been illustrated and described herein, it is not intended to limit the invention and changes and modifications may be made therein within the scope of the following claims.

For example it is possible to design flange ring 10 integrally with the intermediate ring and to provide an insertion groove in the flange for the rowing element 6, which groove then is closed after the rolling element had been inserted. Furthermore, it is of course not intended to limit the invention to a three ring bearing.

The invention has application to any two row angular contact bearing such as angular contact ball bearings, conical roller bearings, angular contact cylindrical roller bearings etc.

What is claimed is:

1. Pretensioned, two-row, angular-contact bearing, comprising of one-piece bearing rings with rolling elements between them, resting against flanges on at least one of the bearing rings, means defining the wall thickness of one bearing ring(1) is sufficiently small in comparison to its outer diameter to define an elastic region which can be elastically deformed in a radial direction, the contact angle between the lines of action of the rolling element loads and a plane perpendicular to the axis of the bearing being no more than 15° whereby the radial force component acting to expand said one ring in the elastic region is large during axial displacement of the rings to assemble the rolling elements.

2. Pretensioned, two-row, angular-contact bearing as claimed in claim 1, wherein the ratio of wall thickness of said one bearing ring to the outer diameter of said bearing is about 1:22.

* * * * *